(12) United States Patent
Witt

(10) Patent No.: US 7,418,799 B1
(45) Date of Patent: Sep. 2, 2008

(54) VERSATILE PLANT MANAGEMENT SYSTEM

(76) Inventor: Alfred W. Witt, 8141 Spicewood Rd., Pensacola, FL (US) 32526

( * ) Notice: Subject to any disclaimer, the term of this patent is extended or adjusted under 35 U.S.C. 154(b) by 92 days.

(21) Appl. No.: 11/495,128

(22) Filed: Jul. 31, 2006

(51) Int. Cl.
*A01G 24/04* (2006.01)

(52) U.S. Cl. ............................. 47/81; 47/48.5; 47/62 E

(58) Field of Classification Search ................. 47/65.5, 47/66.6, 73, 75, 78, 79, 81, 48.5, 59 R, 62 E, 47/62 R
See application file for complete search history.

(56) References Cited

U.S. PATENT DOCUMENTS

| | | | |
|---|---|---|---|
| 774,288 A | 11/1904 | Temblett et al. | |
| 1,439,143 A | 12/1922 | Buss | |
| 1,784,621 A | 12/1930 | Boyer | |
| 1,897,520 A | 2/1933 | Kimber | |
| 1,907,775 A | 5/1933 | Flock | |
| 2,276,749 A | 3/1942 | Vanderveer | |
| 2,438,802 A | 3/1948 | Carlson | |
| 2,792,960 A | 5/1957 | Walouke | |
| 2,898,705 A | 8/1959 | Carlson | |
| 3,233,367 A | 2/1966 | Hagle | |
| 3,309,814 A | 3/1967 | Langley | |
| 3,369,321 A | 2/1968 | Blackistone, Jr. | |
| 3,541,727 A | 11/1970 | Carlson | |
| 4,142,324 A * | 3/1979 | Magyar, Jr. | 47/75 |
| 5,199,213 A | 4/1993 | Krebs et al. | |
| 5,307,589 A * | 5/1994 | Rigsby | 47/59 R |
| 6,092,330 A | 7/2000 | Pratt | |
| 6,173,531 B1 * | 1/2001 | Howell | 47/73 |
| 6,223,466 B1 | 5/2001 | Billings | |
| 6,370,819 B1 * | 4/2002 | Reiss et al. | 47/81 |
| 6,526,693 B2 | 3/2003 | Cochran | |

* cited by examiner

*Primary Examiner*—T. Nguyen
(74) *Attorney, Agent, or Firm*—Peter Loffler

(57) ABSTRACT

A plant management system allows a person to be able to swap plants out with ease whenever a new look is desired for a garden. The system uses a series of subterraneanly disposed receptors that each removably receive a plant pot therein. The receptors are fluid flow connected to one another and to a source of water such that water is introduced into the system and enters and fills each receptor in turn wherein the plant pot wicks the water to the plant the pot is holding. Each receptor has a well screen casing to channel out excess water out of the receptor and each pot is perforated to channel excess water out of the pot.

8 Claims, 5 Drawing Sheets

VERSATILE PLANT MANAGEMENT SYSTEM

BACKGROUND OF THE INVENTION

1. Field of the Invention

The present invention relates to a plant management system that allows plants to be changed out as desired and to be watered as needed.

2. Background of the Prior Art

Many people spend large sums of time, effort and money on establishing and maintaining a garden about the house. Good landscaping gives a green thumb a sense of accomplishment and satisfaction and gives the home a more aesthetic appeal. Typically, a gardener designs a landscaping scheme and thereafter purchases the various plants and plants them into the ground and thereafter maintains the plants as needed. This tried and true method of landscaping has been practiced for generations.

There are, however, certain limitations to the standard home landscaping method. Many plants have a brief flowering season each year yet homeowners desire to have an extended flowering run. The homeowner can plant a wide variety of plants with each type having a differing flowering season. This allows the homeowner to have a longer duration of flowering although the flowering density about the house is lower as some plants flower and others do not during a given time period. Oftentimes, such a scheme requires that aesthetically incompatible plants be used with one another in order to achieve the extended flowering period.

Accordingly, many homeowners simply want to change plants out to coincide with the changes of the season, or just to create a different look for the garden. In such a case, the old plants must be dug up and replaced with the new plants. This is extremely time intensive and laborious, so much so that many a home landscaper will forgo the desired landscape change. Additionally, the digging up of old plants and replanting of the new ones, tends to disturb the surrounding soil, which needs time to "heal" in order to achieve its proper aesthetic look.

Accordingly, there exists a need in the art for a system that allows a homeowner to be able to quickly and easily remove an old plant from the ground and replant a new one, which system addresses the shortcoming noted above. Such a system must allow the plants to be swapped out without the time-consuming and backbreaking effort of digging up the old plants and replanting the new ones. Such a system, once installed, must not disturb the surrounding soil during plant swapping. Ideally, such a system will allow a homeowner to bring plants inside during extreme weather conditions. Such a system must assist in water management for the plants utilizing the system and should isolate the plants from subterranean insects.

SUMMARY OF THE INVENTION

The versatile plant management system of the present invention addresses the aforementioned needs in the art by providing a system that allows a homeowner to be able to quickly and easily remove an old plant from the ground and replant a new one, in order to change plants with the seasons or simply to create a new landscaping look. The versatile plant management system allows the plants to be swapped out without the time-consuming and back breaking effort of digging up the old plants and replanting the new ones. Once the system is installed, use of the system does not disturb the surrounding soil during plant swapping allowing the garden to have continuous aesthetic appeal. The versatile plant management system allows a homeowner to bring plants inside during extreme weather conditions such as cold snaps or hurricanes. The versatile plant management system assists in water management for the plants utilizing the system by providing water introduction for the entire garden from a single location. The present invention isolates the plants utilizing the system from subterranean insects.

The versatile plant management system of the present invention is comprised of a first receptor that has a first open top, a first closed bottom, a first inlet port, and a first outlet port, such that the first receptor is subterraneanly disposed and the first inlet port is connected to a source of water by a first pipe that is also subterraneanly disposed. A second receptor has a second open top, a second closed bottom, a second inlet port, and a second outlet port, the second receptor is also subterraneanly disposed. The second inlet port is fluid flow connected with the first outlet port by a second pipe that is also subterraneanly disposed. A first plant pot has a first wick extending downwardly and the first plant pot is removably receivable within the first receptor through the first open top such that the first wick extends toward the first closed bottom of the first receptor. Similarly, a second plant pot has a second wick extending downwardly and the second plant pot is removably receivable within the second receptor through the second open top such that the second wick extends toward the second closed bottom of the second receptor. Water flows into the first inlet port and partially fills the first receptor and thereafter flows out of the first outlet port and into the second inlet port and partially fills the second receptor and thereafter flows out of the second outlet port. The water is wicked into the first plant pot via the first wick whenever the first receptor is partially filled and water wicks into the second plant pot via the second wick whenever the second receptor is partially filled. The first receptor has a first well screen casing and the second receptor has a second well screen casing with the first well screen casing being located between the first inlet port and the first open top and the second well screen casing being located between the second inlet port and the second open top. The first plant pot is perforated and the second plant pot is perforated.

BRIEF DESCRIPTION OF THE DRAWINGS

Similar reference numerals refer to similar parts throughout the several views of the drawings.

DESCRIPTION OF THE PREFERRED EMBODIMENT

Figure 1:
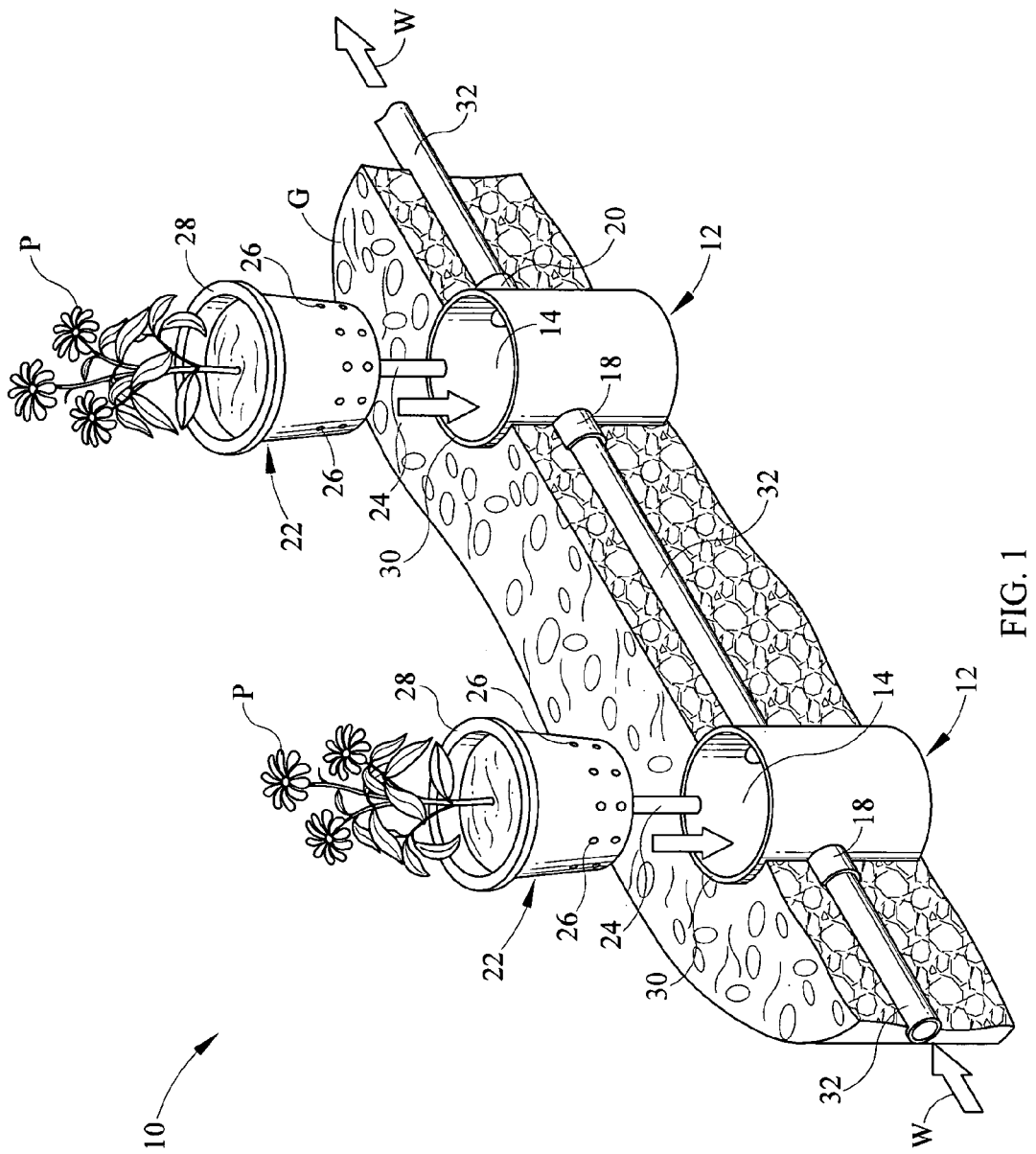
FIG. 1 is a perspective view of the versatile plant management system of the present invention.
Figure 2:
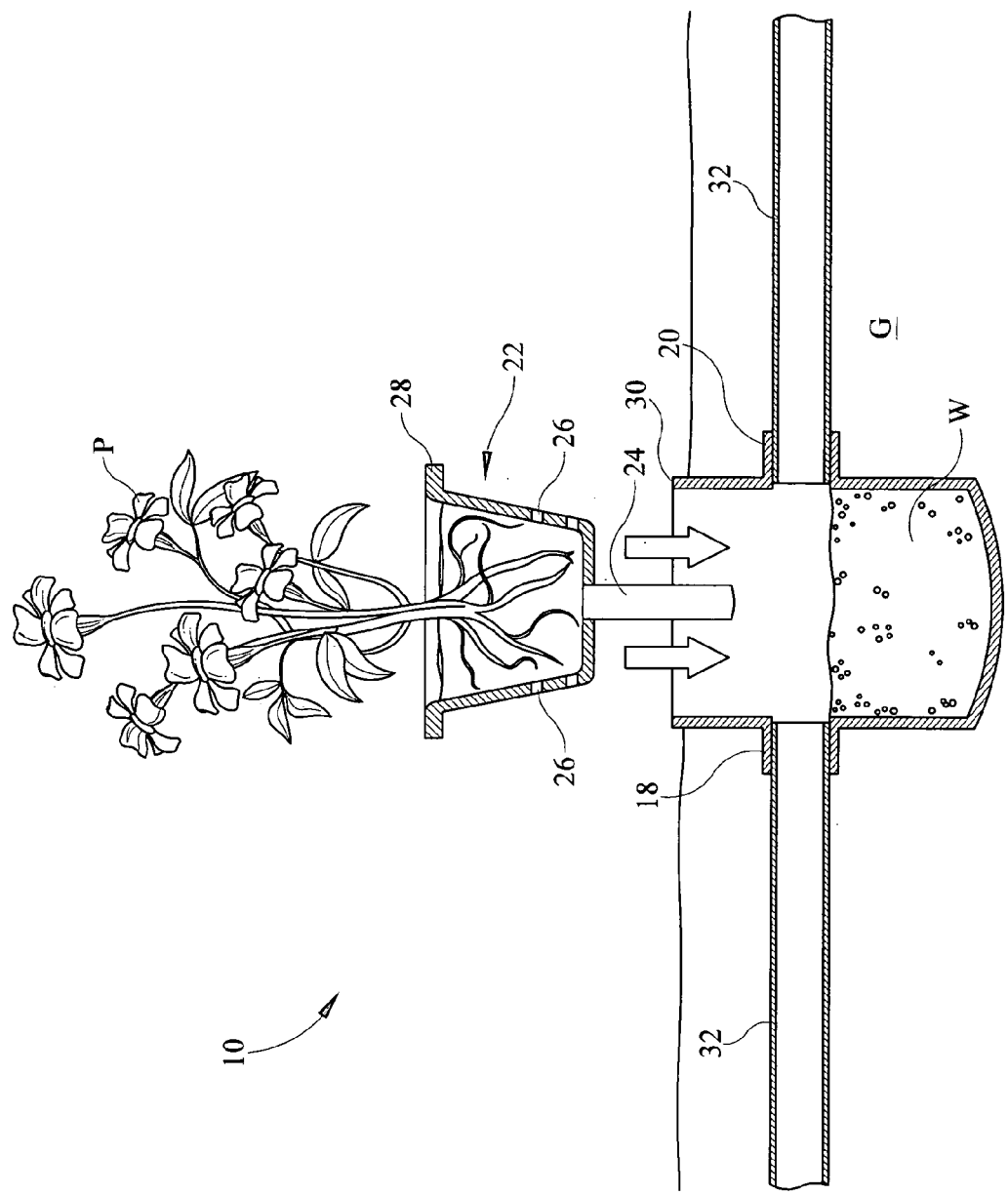
FIG. 2 is a sectioned view of the versatile plant management system receiving a plant.
Figure 3:
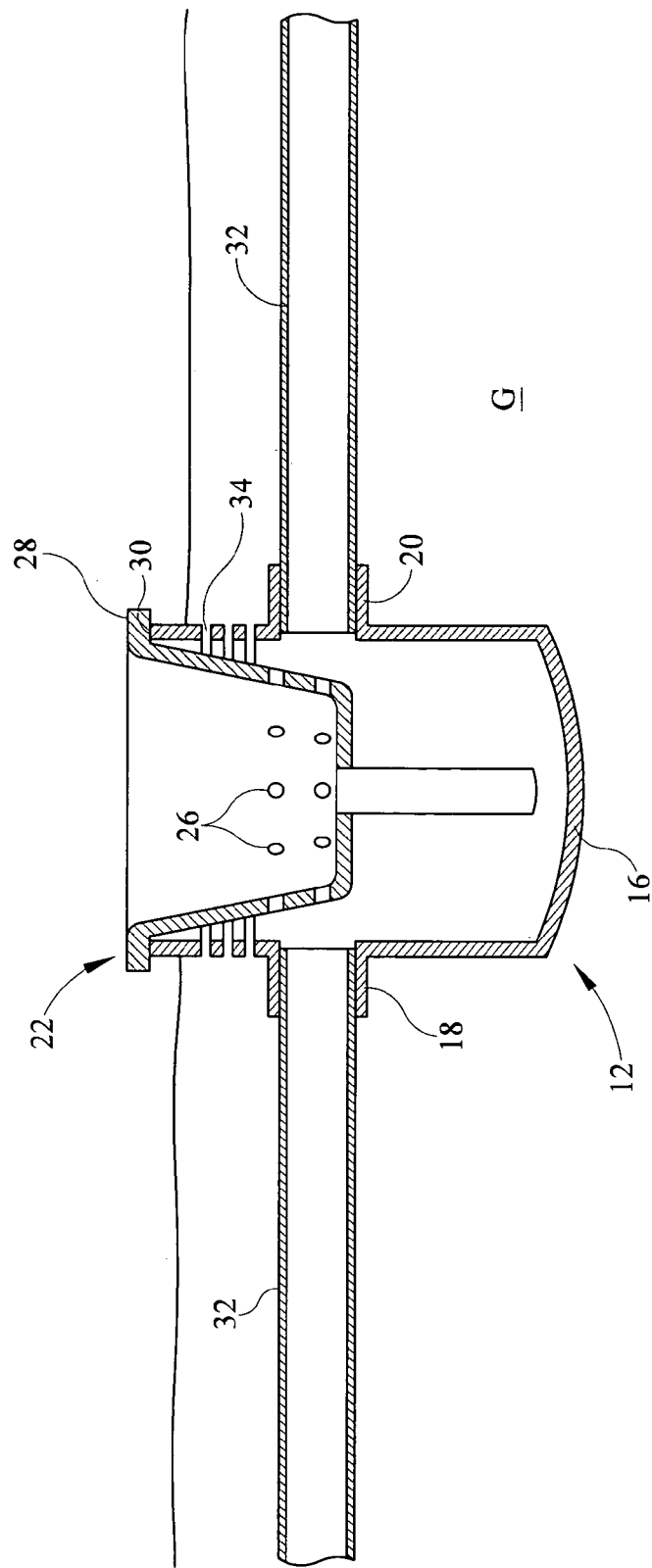
FIG. 3 is a sectioned view of the versatile plant management system utilizing a well screen casing.
Figure 4:
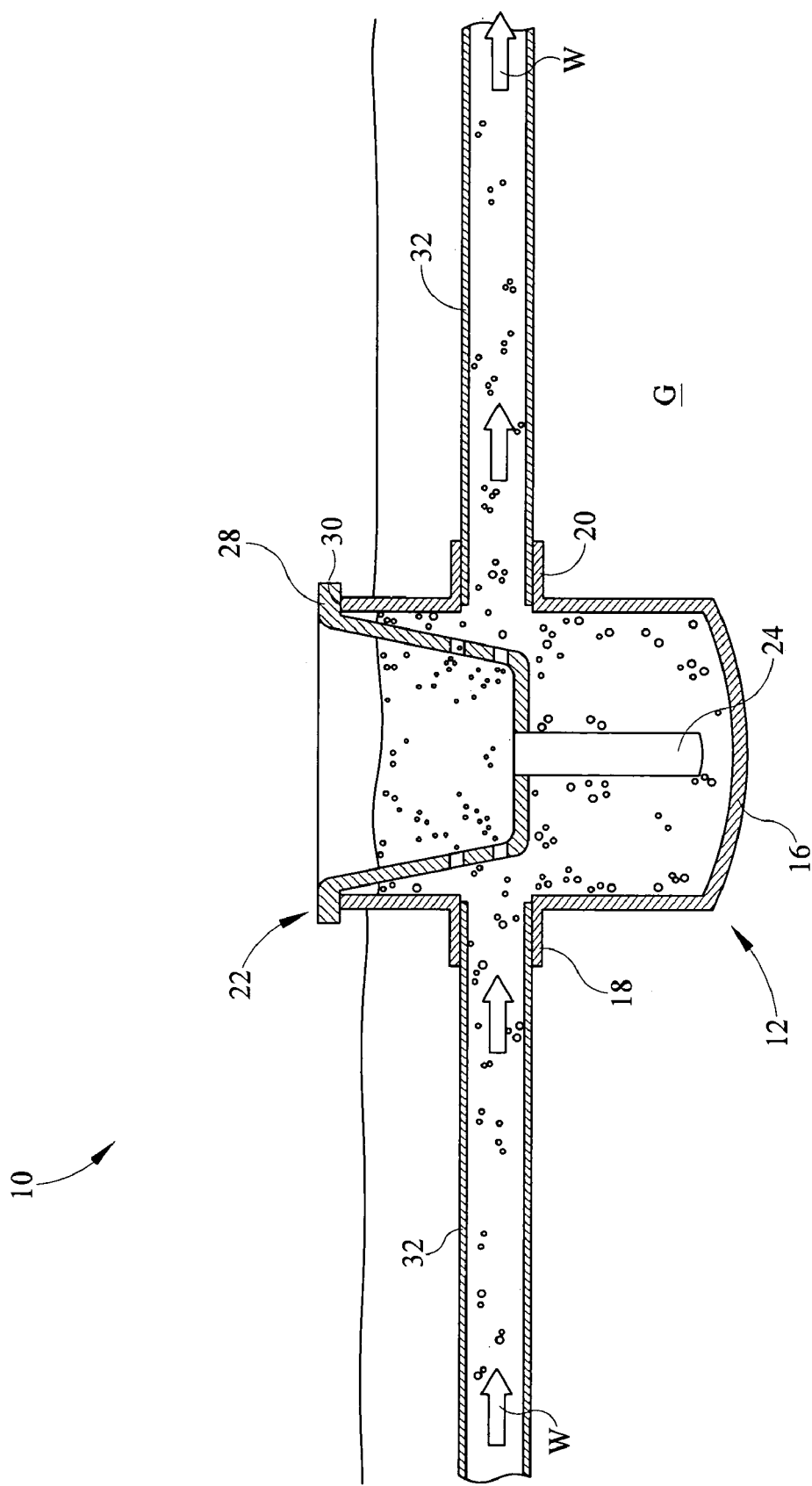
FIG. 4 is a sectioned view of the versatile plant management system during a water introduction cycle.
Figure 5:
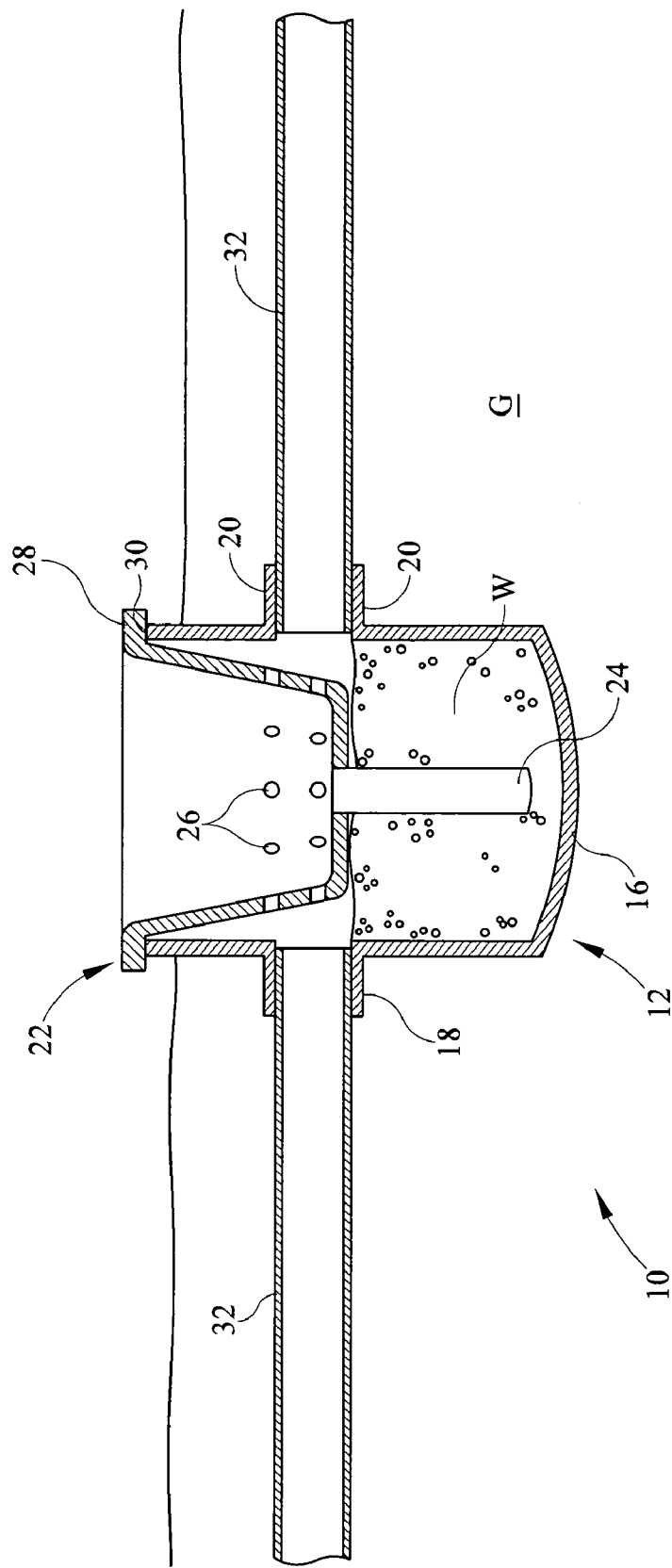
FIG. 5 is a sectioned view of the versatile plant management system sometime after the cessation of the water introduction cycle.

Referring now to the drawings, it is seen that the versatile plant management system of the present invention, generally denoted by reference numeral 10, is comprised of a series of receptors 12, each having an open top 14, a closed bottom 16, an inlet port 18 and an outlet port 20. A plant pot 22 that holds plants P has a wick 24 that extends downwardly from the plant pot's bottom. The plant pot 22 has a series of perforations 26. Each plant pot 22 is sized to be received within a receptor 12 with the lip 28 of the plant pot 22 resting on the upper rim 30 of the receptor 12 so that the plant pot 22 is not fully contained within the receptor 12. The receptor may be sized to accommodate multiple plant pots 22 as desired, or plant pots that are not necessarily cylindrical in shape.

Each receptor 12 is disposed within the ground G such that the rim 30 of the receptor is located at ground level or just very slightly above the ground G. The inlet port 18 of one receptor 12 is fluid flow connected with the outlet port 20 of an adjacent receptor 22 by a pipe 32 that is also subterraneanly disposed. The inlet port 18 of the first receptor 12 is fluid flow connected to a source of water (not illustrated) by a pipe 32 that is also subterraneanly disposed. The last receptor 12 in the series of receptors 12 can either have no pipe 32 attached to its outlet port 20 or can have a pipe 32 attached thereto in order to channel any excess water away from the receptor 12. Each receptor 12 may have a well screen casing 34 thereon, preferably between the outlet port 20 and the rim 30. (The pipes 32 may have well screen casings (not illustrated) in addition or instead of the well screen casings 34 located on the receptors 12.

The receptors 12 may be made from any appropriate material such as PVC and the pipes 32 may likewise be made of the same or similar material. Although the receptors 12 and the pipes 32 may be made from other materials, the use of PVC or similar material allows the system 10 to be lightweight, easy to assemble, simply needing to glue the components together, and be highly resistant to subterranean decay.

In use, the receptors 12 are each subterraneanly disposed and are connected to one another by the pipes 32 with the inlet port 18 of the first receptor 12 being attachable to a source of water (this can include any appropriate architecture such as having the first pipe 32 have on its non-receptor end a hose bid so that a hose can be connected to the bib and to the source of water, or can be directly connected to the home's water supply with an appropriate valve disposed inline, etc.). A desired plant P is placed into each pot 22 in the usual way and each pot 22 is placed into one of the receptors 12. The plant P is now maintained in the usual way. When water W is needed, the water W is introduced in the appropriate way into the first pipe 32 such that the water W flows into the first receptor 12 and partially fills the receptor 12 and once the water reaches the height of the outlet port 20, the water then flows through the connector pipe 32 to the next receptor 12 partially fills this receptor 12 and thereafter the water W flows to the next receptor 12 and so on until all receptors 12 receive water W. As noted above, the last receptor 12 in line need not have a pipe 32 connected to its outlet port 20 or may have a pipe 32 so that any excess water W can be carried away from the receptor 12. Water W is wicked up into the plant pot 22 via the wick 24 where the water W is used by the plant P. As the wick 24 reaches down to almost the bottom 16 of the receptor 12, only occasional watering is needed with the receptor 12 acting as a water storage device. As the receptor 12 is subterraneanly disposed and has its top 14 covered by the plant pot 22, very little water W is lost due to evaporation. If the plant pot 22 receives too much water W, such as due to rain, the water W exits the plant pot 22 through the series of perforations 26 and is deposited into the receptor 12 for subsequent use. If too much water W enters and remains within the receptor 12, the excess water escapes out of the receptor through the well screen casing 34, with the well screen casing helping prevent soil intrusion into the receptor 12. If additional water W remains below the level of the well screen casing 34, the additional water W is carried away by the pipes 32 that carry the excess water W from one receptor 12 to another until the excess water W reaches the last receptor 12 in the series whereat the water W exits the outlet port 20 of this last receptor 12. As such, when the system 10 is stable, water W will at most reach the height of the outlet port 20 so that the plant pot 22 is not sitting in water W and is only wicking water W to its plant P. The system 10 is appropriately sloped to achieve this result.

When a new plant is desired, the old plant pot 22 is removed from the receptor 12 and replaced with a new plant pot 22 that holds the desired plant P therein (or the plant pot 22 that is removed is simply taken to a place of shelter to keep the plant P out of harm's way during inclement weather. The system 10 does not rely on digging up old plants P once new ones are desired or covering the plants P when a cold snap occurs. Additionally, the receptor 12 and the plant pot 22 act as a barrier to subterranean insects and other pests.

While the invention has been particularly shown and described with reference to an embodiment thereof, it will be appreciated by those skilled in the art that various changes in form and detail may be made without departing from the spirit and scope of the invention.

I claim:

1. A plant system comprising:
   a first receptor having a first open top, a first closed bottom, a first inlet port located medially of the first open top and the first closed bottom above the first closed bottom, and a first outlet port, also located medially of the first open top and the first closed bottom above the first closed bottom so that a first fluid well is created below the first inlet port and the first outlet port, the first inlet port adapted to be connected to a source of water;
   a second receptor having a second open top, a second closed bottom, a second inlet port located medially of the second open top and the second closed bottom above the second closed bottom, and a second outlet port, also located medially of the second open top and the second closed bottom above the second closed bottom so that a second fluid well is created below the second inlet port and the second outlet port, the second inlet port fluid flow connected with the first outlet port;
   a first plant pot removably receivable within the first receptor through the first open top;
   a second plant pot removably receivable within the second receptor through the second open top; and
   wherein the water flows into the first inlet port and partially fills the first receptor within the first well and thereafter flows out of the first outlet port and into the second inlet port and partially fills the second receptor within the second well and thereafter flows out of the second outlet port and wherein the water is wicked into the first plant pot whenever the first receptor is partially filled and water wicks into the second plant pot whenever the second receptor is filled.

2. The plant system as in claim 1 wherein the first receptor has a first well screen casing and the second receptor has a second well screen casing.

3. The plant system as in claim 2 wherein the first well screen casing is located between the first inlet port and the first open top and the second well screen casing is located between the second inlet port and the second open top.

4. The plant system as in claim 1 wherein the first plant pot is perforated and the second plant pot is perforated.

5. A plant system comprising:
   a first receptor having a first open top, a first closed bottom, a first inlet port located medially of the first open top and the first closed bottom above the first closed bottom, and a first outlet port, also located medially of the first open top and the first closed bottom above the first closed bottom so that a first fluid well is created below the first inlet port and the first outlet port, the first receptor being subterraneanly disposed, the first inlet port adapted to be connected to a source of water by a first pipe that is subterraneanly disposed;

a second receptor having a second open top, a second closed bottom, a second inlet port located medially of the second open top and the second closed bottom above the second closed bottom, and a second outlet port also located medially of the second open top and the second closed bottom above the second closed bottom so that a second fluid well is created below the second inlet port and the second outlet port, the second receptor being subterraneanly disposed, the second inlet port fluid flow connected with the first outlet port by a second pipe that is subterraneanly disposed;

a first plant pot having a first wick extending downwardly, the first plant pot removably receivable within the first receptor through the first open top such that the first wick extends toward the first closed bottom of the first receptor;

a second plant pot having a second wick extending downwardly, the second plant pot removably receivable within the second receptor through the second open top such that the second wick extends toward the second closed bottom of the second receptor, and wherein the water flows into the first inlet port and partially fills the first receptor within the first well and thereafter flows out of the first outlet port and into the second inlet port and partially fills the second receptor within the second well and thereafter flows out of the second outlet port and wherein the water is wicked into the first plant pot via the first wick whenever the first receptor is partially filled and water wicks into the second plant pot via the second wick whenever the second receptor is filled.

6. The plant system as in claim 5 wherein the first receptor has a first well screen casing and the second receptor has a second well screen casing.

7. The plant system as in claim 6 wherein the first well screen casing is located between the first inlet port and the first open top and the second well screen casing is located between the second inlet port and the second open top.

8. The plant system as in claim 5 wherein the first plant pot is perforated and the second plant pot is perforated.

* * * * *